United States Patent [19]

Hart

[11] Patent Number: 5,800,738
[45] Date of Patent: *Sep. 1, 1998

[54] METHODS FOR INHIBITING FOAM IN CRUDE OILS

[75] Inventor: Paul R. Hart, The Woodlands, Tex.

[73] Assignee: BetzDearborn Inc., Trevose, Pa.

[*] Notice: The term of this patent shall not extend beyond the expiration date of Pat. No. 5,667,669.

[21] Appl. No.: 664,017

[22] Filed: Jun. 13, 1996

[51] Int. Cl.$^6$ .............................. B01D 19/04; C10G 7/00
[52] U.S. Cl. .............................. 252/321; 95/155; 203/20; 208/348
[58] Field of Search .............................. 252/321, 203, 252/20, 208, 93, 348, 95, 155

[56] References Cited

U.S. PATENT DOCUMENTS

| | | | |
|---|---|---|---|
| 2,702,793 | 2/1955 | Smith | 252/78 |
| 2,862,885 | 12/1958 | Nelson et al. | 252/49.6 |
| 3,959,175 | 5/1976 | Smith, Jr. et al. | 252/321 |
| 4,005,044 | 1/1977 | Raleigh | 252/358 |
| 4,594,378 | 6/1986 | Tipton et al. | 524/106 |
| 5,169,560 | 12/1992 | Hart | 252/321 |
| 5,229,033 | 7/1993 | Nguyen et al. | 252/321 X |
| 5,296,132 | 3/1994 | Hart | 208/131 |
| 5,389,299 | 2/1995 | Hart | 252/321 |
| 5,472,637 | 12/1995 | Hart | 252/358 |
| 5,562,862 | 10/1996 | Berzansky, Jr. et al. | 252/321 |
| 5,667,669 | 9/1997 | Hart | 203/20 X |

OTHER PUBLICATIONS

Berkman et al: "Emulsions and Foams", Reinhold Publ. Corp., New York (1941) |Tp 156.E6 B45| pp. 228–234.

*Primary Examiner*—Richard D. Lovering
*Attorney, Agent, or Firm*—Alexander D. Ricci; Philip H. Von Neida

[57] ABSTRACT

Methods for inhibiting foam in crude oil or its fractions undergoing processing are disclosed. Low molecular weight polyisobutylene, preferably of about 320 daltons, is added to the crude oil or fraction experiencing foaming.

6 Claims, No Drawings

METHODS FOR INHIBITING FOAM IN CRUDE OILS

FIELD OF THE INVENTION

The present invention relates to methods for inhibiting foam during the processing of crude oils. More particularly, the present invention relates to the use of low molecular weight polyisobutylenes to inhibit foam during crude oil processing.

BACKGROUND OF THE INVENTION

Severe foaming problems are often encountered in crude oils during separation of dissolved gases at the wellhead. Foaming problems can also occur during the high temperature processing of crude oils and their various distillation fractions, including residues. Crude oil towers and cokers operating at high temperatures can produce foam in their hydrocarbon products which in turn diminishes the efficiency of the tower or coker, degrading the quality of the overhead products such as gasoline and gas oils.

In the processing of desalted crude oils into various fuels and residual oil, the first step is its distillation. The crude is heated to about 400° C. in a heat exchanging furnace, then charged to a trayed or packed column and fractionated at or above atmospheric pressure into fluids with various boiling point ranges. The residue is then generally fed to a similar tower operated at less than atmospheric pressure, and fractionated further. This distillation process often produces a quantity of foam which is undesirable since it contaminates the distillation cuts with heavier material, diminishing their quality.

In the processing of various residual petroleum stocks into coke, a commonly used technique is the well known delayed coking process. In the delayed coking process, heavy residual oils are heated to about 500° C. by pumping them at high velocity through a pipe furnace and then charging these oils to an insulated coking drum. The delayed coking process produces a quantity of foam which is undesirable since it diminishes the efficient operation of the process by decreasing the density of the coke and contaminating the overhead gas oils with coke which subsequently fouls heat exchangers.

Other refinery processes that can experience foaming problems include hydrogenation separators (for desulfurization, cracking or treating olefins) and solvent deasphalting units.

Traditionally, silicone (dimethyl polysiloxane) based antifoam compounds were employed to treat these operations for foaming problems. For example, U.S. Pat. No. 2,862,885 teaches a hydrocarbon oil which contains a homopolymer of a monovinylalkoxysilane to inhibit foaming of the hydrocarbon oil. U.S. Pat. No. 2,702,793 teaches the use of a blend of 100,000 cSt dimethylsilicone and amyltriethoxysilane to inhibit foaming in hydrocarbon oils. U.S. Pat. No. 4,005,044 discloses the use of a dimethylpolysiloxane fluid in the solution of an emulsifying agent as a defoamer.

The use of silicone-based defoaming compounds is economically attractive due to their low dosage levels in the hydrocarbons. However, they pose a problem in being expensive with respect to using them in less expensive hydrocarbon fluids. The silicone-based compounds also pose a problem due to their difficulty in dispersing in high temperature hydrocarbon systems. The silicone-based compounds tend to react with the metal surfaces of the processing systems. Another significant problem to the oil industry is that silicone-based defoamers poison downstream catalysts with silicon carryover and residues.

U.S. Pat. No. 5,472,637 teaches an alternative composition to silicone comprising a polyisobutylene and a finely divided carbon selected from the group consisting of coke, graphite, and carbon black. This patent demonstrated that polyisobutylenes having molecular weights of $2\times10^3$ and $2\times10^6$ daltons were effective at inhibiting foaming in crude oils and their residues, especially residues fed to delayed cokers.

The present inventor has surprisingly discovered that polyisobutylenes having molecular weights in the range of about 112 daltons to about 1960 daltons are effective at inhibiting foaming in crude oils, especially during atmospheric pressure distillation.

DETAILED DESCRIPTION OF THE INVENTION

The present invention relates to methods for inhibiting foam in crude oils and fractions during processing comprising adding to the crude oils or fraction an effective foam inhibiting amount of a low molecular weight polyisobutylene. For purposes of the present invention, a low molecular weight polyisobutylene is defined as having a molecular weight from about 112 daltons to about 1960 daltons.

The low molecular weight polyisobutylenes of the present invention are particularly useful in crude oil processing steps including but not limited to distillation, degassing (as, for example, in propane deasphalting) and decomposition (as, for example, in coking).

Preferably the polyisobutylenes of the present invention have molecular weights ranging from about 224 daltons to about 504 daltons. These compounds are commercially available from Amoco Chemical as the Indopol "L" Series: L-14, L-50, L65 and L-100, and the Lower "H" Series: H-25, H-100 and H-300. Of these compounds, the preferred member L-14 has an average molecular weight of 320 (by vapor pressure) or 370 (by gel permeation chromatography). Indopol is a registered trademark of Amoco Chemical Company.

The crude oil fractions which are treated by the present invention are those naturally containing the heavier, less distillable, more surface active molecules typically containing heteroatoms which are described as resins, asphaltenes, polynuclear aromatics, polars, organic or naphthenic acids, amines, alcohols and the like. For purposes of the present invention, crude oils comprise crude oil and its fractions produced or left after normal refinery processing steps, such as desalting, distillation, cracking, coking, extraction, hydrogenation, isomerization, or alkylation.

The polyisobutylene can be applied at any stage of the crude oil processing system that is experiencing foaming. Preferably the polyisobutylene is applied either upstream of the location experiencing foaming or directly to the site of the foaming.

The polyisobutylene may be added to the crude oil either neat or in a suitable solvent. Any solvent that is compatible with both the polyisobutylene and the crude oil or its fraction would be suitable. Preferably the solvent is a hydrocarbon such as an aromatic or a naphtha. An advantage that the lower molecular weight polyisobutylenes have is that they are pumpable liquids with lower viscosities than the higher molecular weight polyisobutylenes. For example, at 20° C. Indopol L-14 has a kinematic viscosity of 75 cSt and L-100 has a kinematic viscosity of 700. In contrast, Indopol H-1900 has a kinematic viscosity 1,000,000. As such, even for the same amount, the lower molecular weight polyisobutylenes do not require heating and dilution in solvent to deliver and can be fed neat using a smaller, less expensive pump. Even the lower molecular weight polyisobutylenes that are not pumpable neat can be dissolved in hydrocarbon solvent at higher activities for more efficient delivery.

For purposes of the present invention, the term effective foam inhibiting amount can be defined as that amount which inhibits foaming of the crude oil. This amount will vary according to the conditions of the processing system, and the crude oil or fraction being processed. Preferably, the amount of low molecular weight polyisobutylene ranges from 1 part to about 10,000 parts per million parts crude oil. More preferably, this amount ranges from about 10 parts to about 1,000 parts per million parts of crude oil.

The polyisobutylene may be added to the crude oil or crude oil processing system alone or with other crude oil treatment programs. These other treatments can include, for instance, antifoulants and corrosion inhibitors.

In order to more clearly illustrate the present invention, the data set forth below were developed. The following examples are included as being illustrative of the present invention as a defoamer and should not be construed as limiting the scope thereof.

EXAMPLE
High Temperature Defoamer Test

A 500 mL borosilicate glass cylinder is charged with 250 mL crude oil or fraction thereof. The sample is sparged slowly (100–200 mL/min) with nitrogen using a submerged borosilicate tube with a specified pore fritted glass diffuser. All diffusers for a given series of compatible tests should be equivalent by ASTM E-128, Test for Permeability of Rigid Porous Filters.

The sample is heated with an electric mantle to the temperature of the unit (typically 750°–900° F. for a coker, 500°–750° F. for a crude tower). As the sample approaches the temperature of the unit (within 50° F.) the nitrogen flow is increased to bring the foam height above the 500 mL mark (200–1000 mL/min).

Defoamer is continuously added as a dilute solution (about 1–10% active) from a weighed syringe at the minimum rate which maintains the foam height at the 500 mL mark or some standard lower mark. The time of first injection is recorded. After continuously foaming under control for 60 minutes, the test is terminated, the syringe is reweighed, and the usage rate is recorded. The usage rate can be converted to a concentration by multiplying by the mean residence time of the unit being tested and dividing by the test volume (250 mL).

The results of this testing for a crude oil distillation are presented in Table I.

TABLE I

| Crude Oil Defoamer Test 730° F. 630 mL/min N₂ Sparge Frit Pore Size: "A" | | | |
|---|---|---|---|
| | Usage Rate (mg active/min.) | | |
| Chemical Treatment | Crude 1 | Crude 2 | Crude 3 |
| Inventive Examples | | | |
| Indopol L-14 | 16.01 | 5.41 | 2.01 |
| Indopol L-50 | | 9.00 | |

TABLE I-continued

| Crude Oil Defoamer Test 730° F. 630 mL/min N₂ Sparge Frit Pore Size: "A" | | | |
|---|---|---|---|
| | Usage Rate (mg active/min.) | | |
| Chemical Treatment | Crude 1 | Crude 2 | Crude 3 |
| Indopol L-65 | | 10.81 | |
| Indopol L-100 | | 10.21 | |
| Comparative Examples | | | |
| Indopol H-1900 | 107.67 | | |
| Indopol H-1900 and carbon black[1] | 18.84 | | |
| DMPS, 60,000 cSt, end = methyl | 1.25 | | |
| DMPS, 100,000 cSt, end = methyl | 0.95 | 1.20 | 1.13 |
| DMPS, 9000, cSt, end = hydroxyl | 1.31 | | |

Indopol L-14 is polyisobutylene, mean mw 320 daltons
Indopol L-50 is polyisobutylene, mean mw 420 daltons
Indopol L-65 is polyisobutylene, mean mw 435 daltons
Indopol L-100 is polyisobutylene, mean mw 460 daltons
Indopol H-1900 is polyisobutylene, mean mw 2,300 daltons
[1] See U.S. Pat. No. 5,472,637
DMPS is dimethylpolysiloxane As demonstrated in Table I, the polyisobutylenes of the present invention (MW of 112 to 1960 daltons) were more effective at inhibiting foaming in crude oils than the polyisobutylene utilized by itself as taught in U.S. Pat. No. 5,472,637 having a molecular weight of 2,300 daltons.

Further testing was performed on a coker feed utilizing the test procedure used for Table I. These results are presented in Tables II and III.

TABLE II

| Coker Defoamer Test 800° F. 600 mL/min N₂ Sparge "Coarse" Frit | |
|---|---|
| Chemical Treatment | Usage Rate (mg active/min.) |
| Inventive Examples | |
| Indopol H-300 | 0.319 |
| Comparative Examples | |
| Indopol H-1900 | 0.485 |
| DMPS, 60,000 cSt, end = methyl | 0.035 |

Indopol H-300 is polyisobutylene, mean mw 1,290 daltons
Indopol H-1900 is polyisobutylene, mean mw 2,300 daltons
DMPS is dimethylpolysiloxane The use of the inventive polyisobutylene having a molecular weight of 1290 daltons resulted in a better treatment for foam in a coker feed than the higher molecular weight polyisobutylene taught in U.S. Pat. No. 5,472,637.

TABLE III

| Coker Defoamer Test 840° F. 600 mL/min N₂ Sparge "Coarse" Frit | |
|---|---|
| Chemical Treatment | Usage Rate (mg active/min.) |
| Inventive Examples | |
| Indopol L-14 | did not work |
| Indopol H-25 | did not work |

TABLE III-continued

Coker Defoamer Test
840° F.
600 mL/min N$_2$ Sparge
"Coarse" Frit

| Chemical Treatment | Usage Rate (mg active/min.) |
| --- | --- |
| Indopol H-100 Comparative Examples | did not work |
| Indopol H-1900 | 0.746 |
| DMPS, 60,000 cSt, end = methyl | 0.056 |

Indopol L-14 is polyisobutylene, mean mw 320 daltons
Indopol H-25 is polyisobutylene, mean mw 610 daltons
Indopol H-100 is polyisobutylene, mean mw 900 daltons
Indopol H-1900 is polyisobutylene, mean mw 2,300 daltons
DMPS is dimethyl polysiloxane On this more difficult fluid, at this higher temperature (though not necessarily for either of those reasons), the lowest MW PIB's were not able to control the foam as the higher MW PIB did. The optimum MW may lie somewhere between the two (between 900 and 2300 daltons) or it may lie in the 2×10$^6$ dalton range found for some fluids noted in U.S. Pat. No. 5,472,637. Crude oil residues are quite variable in their composition and requirements.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what I claim is:

1. A method for inhibiting foam during the processing of a stream consisting of crude oil and its fractions in crude unit distillation towers comprising adding to said crude oil and its fractions an effective foam inhibiting amount of polyisobutylene having a molecular weight of about 112 daltons to about 1960 daltons.

2. The method as claimed in claim 1 wherein said polyisobutylene has a molecular weight of about 320 daltons.

3. The method as claimed in claim 1 wherein said polyisobutylene is added to said crude oil at a point upstream of said foaming.

4. The method as claimed in claim 1 wherein said polyisobutylene is added to said crude oil at the site of said foaming.

5. The method as claimed in claim 1 wherein said polyisobutylene is added to said crude oil fraction in an amount ranging from about 1 part to about 10,000 parts per million parts crude oil.

6. The method as claimed in claim 1 wherein said polyisobutylene is added to said crude oil fraction in an amount ranging from about 10 parts to about 1,000 parts per million parts crude oil.

* * * * *